(12) United States Patent
Love et al.

(10) Patent No.: US 10,892,609 B2
(45) Date of Patent: Jan. 12, 2021

(54) FLEXIBLE CLAD PROTECTION SYSTEM

(71) Applicant: Magnetic Lifting Technologies US, LLC, New Castle, PA (US)

(72) Inventors: Dan Love, Poland, OH (US); Robert Milliron, Salem, OH (US)

(73) Assignee: Magnetic Lifting Technologies US, LLC, New Castle, PA (US)

( * ) Notice: Subject to any disclaimer, the term of this patent is extended or adjusted under 35 U.S.C. 154(b) by 0 days.

(21) Appl. No.: 15/146,992

(22) Filed: May 5, 2016

(65) Prior Publication Data
US 2017/0025833 A1 Jan. 26, 2017

Related U.S. Application Data

(63) Continuation of application No. 14/978,219, filed on Dec. 22, 2015, now Pat. No. 10,008,840.

(60) Provisional application No. 62/194,473, filed on Jul. 20, 2015.

(51) Int. Cl.
*H02G 3/04* (2006.01)
*B66C 1/06* (2006.01)

(52) U.S. Cl.
CPC ............ *H02G 3/0406* (2013.01); *B66C 1/06* (2013.01); *H02G 3/0468* (2013.01); *H02G 3/0475* (2013.01)

(58) Field of Classification Search
CPC ... H02G 3/0406; H02G 3/0475; H02G 3/0468
See application file for complete search history.

(56) References Cited

U.S. PATENT DOCUMENTS

| | | | |
|---|---|---|---|
| 586,113 A * | 9/1887 | Bott | F16L 57/00 |
| 1,822,624 A | 9/1931 | Hoeftmann | |
| 1,977,775 A | 10/1934 | Patterson | |
| 2,160,009 A | 5/1939 | Walker | |
| 4,396,797 A * | 8/1983 | Sakuragi | F16L 11/18 |
| | | | 138/110 |
| 4,739,801 A * | 4/1988 | Kimura | F16G 13/10 |
| | | | 138/120 |
| 5,143,123 A * | 9/1992 | Richards | F16L 11/18 |
| | | | 138/110 |
| 5,547,153 A | 8/1996 | Larsen et al. | |
| 5,626,167 A | 5/1997 | Streit | |
| 5,635,675 A * | 6/1997 | Houga | F16L 7/00 |
| | | | 138/120 |
| 6,152,185 A | 11/2000 | Tucker | |

(Continued)

*Primary Examiner* — Binh B Tran
*Assistant Examiner* — Hiram E Gonzalez
(74) *Attorney, Agent, or Firm* — Buchanan Ingersoll & Rooney PC; Craig G. Cochenour, Esq.

(57) ABSTRACT

Embodiments disclosed herein relate to a protection device and/or system that may include a thimble capable of being placed over a transmission line, such as an electrical power cord, to provide protection in the form of cut resistance, abrasion resistance, and/or impact resistance. In some embodiments, a plurality of thimbles can be placed over the transmission line to form an overlapping arrangement to protect a desired length of the transmission line. While each thimble may be rigid, semi-rigid, and/or flexible, the arrangement can maintain flexibility to allow for many degrees of movement of the electrical power cord even as it is cladded in the protection system.

18 Claims, 6 Drawing Sheets

(56) References Cited

U.S. PATENT DOCUMENTS

| | | | |
|---|---|---|---|
| 6,408,888 B1 * | 6/2002 | Baumer | F16G 13/16 138/120 |
| 6,575,654 B2 * | 6/2003 | Wentworth | H02G 3/0468 138/120 |
| 7,533,906 B2 | 5/2009 | Luettgen et al. | |
| 8,097,806 B2 | 1/2012 | Lalancette et al. | |
| 8,502,069 B2 | 8/2013 | Holland et al. | |
| 8,842,954 B2 * | 9/2014 | Burris | G02B 6/4415 385/101 |
| 2007/0056761 A1 | 3/2007 | Koizumi et al. | |
| 2011/0006512 A1 | 1/2011 | James et al. | |
| 2011/0034257 A1 * | 2/2011 | Wen | F16C 1/26 464/173 |
| 2012/0048415 A1 | 3/2012 | Espinasse et al. | |
| 2013/0192892 A1 | 8/2013 | Blanchard et al. | |

* cited by examiner

FLEXIBLE CLAD PROTECTION SYSTEM

CROSS-REFERENCE TO RELATED APPLICATIONS

This patent application is a continuation of, and claims the benefit of, co-pending U.S. patent application Ser. No. 14/978,219, filed on Dec. 22, 2015, which claims the benefit of U.S. Provisional Patent Application No. 62/194,473, filed on Jul. 20, 2015, which is hereby incorporated by reference in its entirety the disclosures of which are hereby incorporated by reference in their entireties.

FIELD OF THE INVENTION

The present invention is directed toward a protection device and/or system that can protect an item contained within the system or an item that underlies the system. The protection system can be flexible and may be used to surround the item, such an electrical power cord of an electromagnet lifting assembly for example, to form a protective cladding around the item.

BACKGROUND OF THE INVENTION

Many types of machinery, and in particular hoisting machinery, include cables, chains, ropes, etc. to assist with various hoisting and lifting activities. These items can be used as the main hoist line, an auxiliary hoist line, a whip line, a tether, rigging, etc. Some machinery systems augment the hoisting operations with electrical power, hydraulic power, magnetic power, and the like. With such augmented power, transmission lines (e.g., electrical power cords or hydraulic hoses) must generally be utilized with the hoist. For example, an electromagnet hoisting assembly can include a casing which houses an electromagnet. The surface of the casing may include eyelets, shackles, or other rigging points to facilitate connection of the electromagnet to the main hoist line via chains. An electrical power cord can be routed from the hoist to the electromagnet to selectively supply electrical energy for operation of the electromagnet.

A typical use of electromagnets can be in a scrap yard or similar industrial setting to transport loads of scrap in bulk. Such environments can be harsh and include hazards that may cause damage to the electrical power cords and/or rigging chains. For example, lowering the electromagnet into a scrap pile can cause a sharp edge of scrap to cut into the electrical power cord. Electrical power cords of an electromagnet assembly may be covered with plastic or rubber, which can provide some mechanical abrasion protection, but are mainly designed for electrical insulation. Some techniques to provide added protection can include use of a reinforced rubber hose placed over the electrical power cord's plastic covering. Yet, this technique fails to provide adequate protection, mainly because such hoses are not designed to provide a defense against the harsh environments typically experienced in a scrap yard and similar settings. While a rigid tube may provide adequate protection, it is not flexible enough to allow proper operation of the electromagnet as it is moved about the scrap yard to collect and discard scrap.

The present invention is directed toward overcoming one or more of the above-identified problems.

SUMMARY OF THE INVENTION

Embodiments disclosed herein relate to a protection system that may include at least one thimble capable of being placed over a transmission line, such as an electrical power cord, to provide protection in the form of cut resistance, abrasion resistance, and/or impact resistance, while maintaining flexibility. In the event that the item is an electrical power cord, it is contemplated for the thimble to be placed over the existing plastic or rubber covering of the electrical power cord. In some embodiments, a plurality of thimbles can be placed over the transmission line to form an arrangement to protect a desired length of the transmission line. While each thimble may be rigid or semi-rigid, the thimbles overlap and do not interlock and, thus, the arrangement can maintain flexibility to allow for many degrees of movement of the electrical power cord even as it is cladded in the protection system.

In some embodiments, any one thimble can be a tubular member with a straight portion at its first end and a flared portion at its second end. In an arrangement, such as a serial arrangement of a plurality of thimbles, for example, the second end of a first thimble can receive the first end of a second thimble, such that the thimbles overlap. This "engagement" can facilitate forming a sheath of thimble-cladding along a length of the transmission line without any one individual thimble interlocking with another individual thimble. A length of each thimble can be small relative to the overall length of the portion of the transmission line being cladded so that, regardless of whether any one thimble being a rigid structure, with the engagement of the thimbles described above can facilitate several degrees of movement (radial flexing, rotation, rolling, etc.) of the transmission line while maintaining adequate cladding protection to the transmission line.

Further embodiments of the protection system can include at least one sling and at least one lead restraint. The sling can be used to tether the transmission line to a structure of the hoist mechanism. The lead restraint can be used to facilitate connection of the transmission line to its power source.

While embodiments disclosed herein may describe use of the protection system to protect transmission lines, the system is certainly not limited to such use. The system can also be used to protect hose, chain, rope, cable, pipe, etc. Basically, any elongate element can be protected using the inventive system herein described. Furthermore, the system can be used to provide protection from the underlying item in the alternative, or in addition, to the providing protection to the underlying item.

The various embodiments of the disclosed protection system may be referred to as the Armadillo Flexible Clad Protection System, and the various embodiments of the disclosed thimble may be referred to as an Armadillo thimble, due to the overlapping nature of the thimbles in assembly.

In an exemplary embodiment, the protection system is a flexible protection system that can include a serial arrangement of a plurality of thimbles, each thimble having a first end, a second end, and an aperture running along a longitudinal axis of each thimble from the first end to the second end. An outer diameter of the first end of each thimble can be smaller than an inner diameter of the second end of each thimble so as to facilitate at least partial insertion of the first end of a first thimble into the second end of a second thimble placed adjacent the first thimble in an overlapping arrangement and in a non-interlocking engagement. The aperture of each thimble can be sized to receive an elongate item within the serial arrangement of the plurality of thimbles and (i) facilitate free motion of any one thimble relative to other thimbles and (ii) facilitate the free motion of the any one thimble relative to the elongate item, wherein the free motion may be at least one of movement in a longitudinal direction, in a direction transverse to the longitudinal direction, and in a rotational motion about the longitudinal axis. A spacer element can be secured to at least one of the elongate item and the serial arrangement of the plurality of thimbles, the spacer element capable of restricting the free motion of the plurality of thimbles in the longitudinal direction such that at least partial insertion of the first end of each thimble into the second end of each adjacent thimble is maintained without exposure of the elongate item received within the aperture of each thimble.

The serial arrangement can be made to form a sheath around the elongate item to serve as a flexible protective cladding. Further embodiments can include the second end of each thimble having a flared second end. The flexible protection system may further include a sling tethering the elongate item to an ancillary structure. In at least one embodiment, the elongate item can include a transmission line or an electrical power cord. A lead restraint connecting the electrical power cord to an ancillary structure may also be used with the system. Some embodiments include a thimble comprising urethane.

In an alternative embodiment, the flexible protection system can include a plurality of members, each member having a first end and a flared second end, and a bore running along a longitudinal axis of the member from the first end to the flared second end, the bore sized to receive an elongate element to be protected. The plurality of members can be positioned in an overlapping arrangement about the elongate element, such that the first end of a member is received in the flared second end of an adjacent member without an interlocking connection between adjacent members. A spacer element may be secured to at least one of the elongate element and an end one of the plurality of members, the spacer element restricting free motion of the plurality of members in a longitudinal direction such that at least partial insertion of the first end of each member into the flared second end of each adjacent member is maintained without exposure of the elongate element received within the plurality of members. In at least one embodiment, the plurality of members forms a sheath around the elongate element to serve as a flexible protective cladding. Further, each member may be freely rotatable about the elongate element received within its bore.

In at least one embodiment, a protection device for an elongate element can include a member having a first end, a second end, and an aperture formed therein running along a longitudinal axis of the member from the first end to the second end, wherein an inner diameter of the second end is greater than an outer diameter of the first end. The aperture can be configured to slidingly receive an elongate item to at least one of provide protection thereto and provide protection therefrom. The first end of one member can be receivable into the second end of an adjacent member to form an overlapping and non-interlocking engagement between adjacent members such that movement of the one member can occur independently of movement of the adjacent member without exposure of the elongate item slidingly received within the one member and the adjacent member. The first end can be straight and the second end may be flared.

While at least the above-mentioned potential advantages are made possible by technical solutions offered herein, they are not required to be achieved. The presently disclosed protection system can be implemented to achieve technical advantages, whether or not these potential advantages, individually or in combination, are sought or achieved.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present invention will be more apparent from the following more particular description thereof, presented in conjunction with the following drawings, in which.

DETAILED DESCRIPTION OF THE INVENTION

The following description is of an embodiment presently contemplated for carrying out the present invention. This description is not to be taken in a limiting sense, but is made merely for the purpose of describing the general principles and features of the present invention. The scope of the present invention should be determined with reference to the claims.

Figure 1:
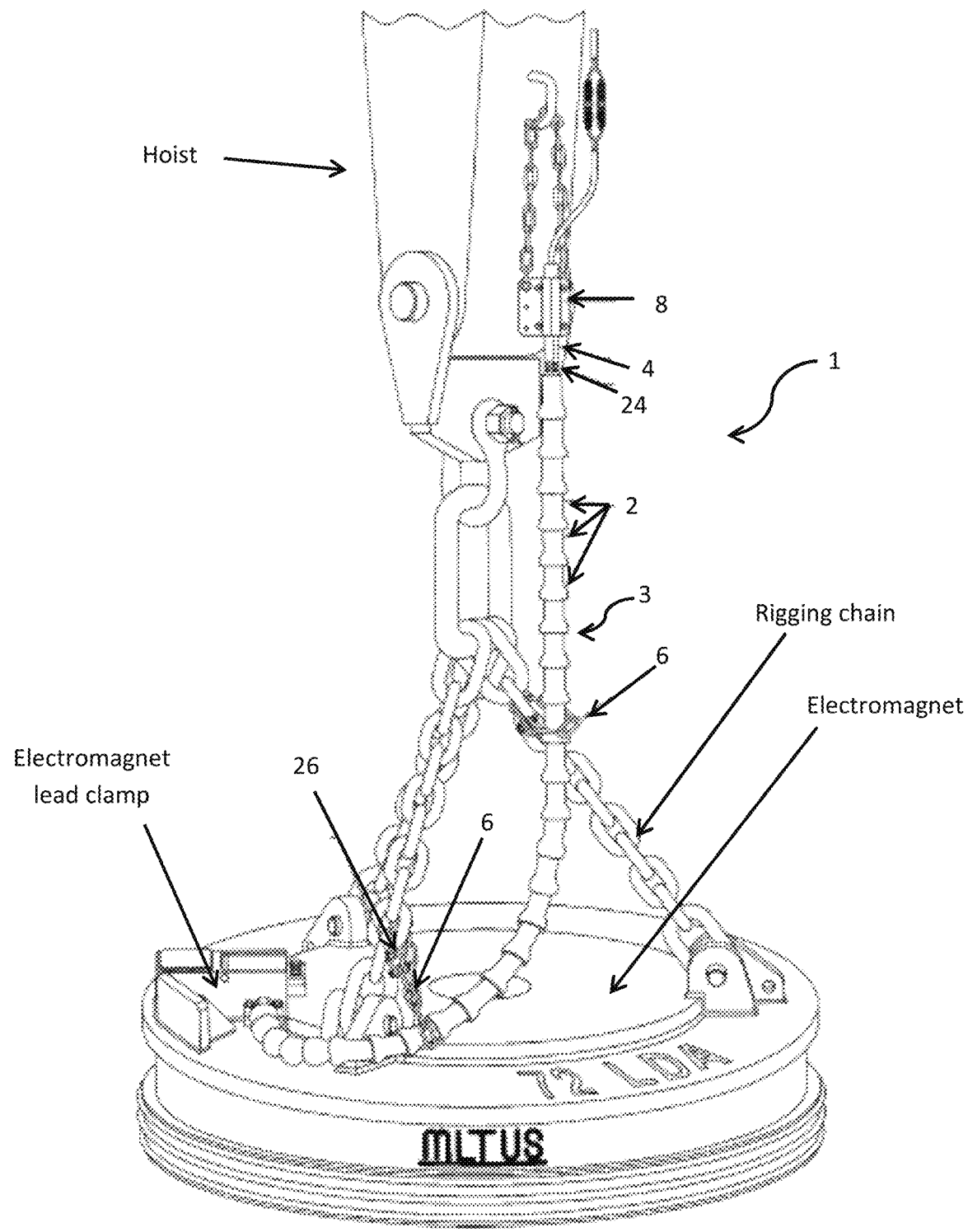
FIG. 1 shows an environmental view of an exemplary protection system used to clad an electrical power cord of an electromagnet lifting assembly.
Figure 2:
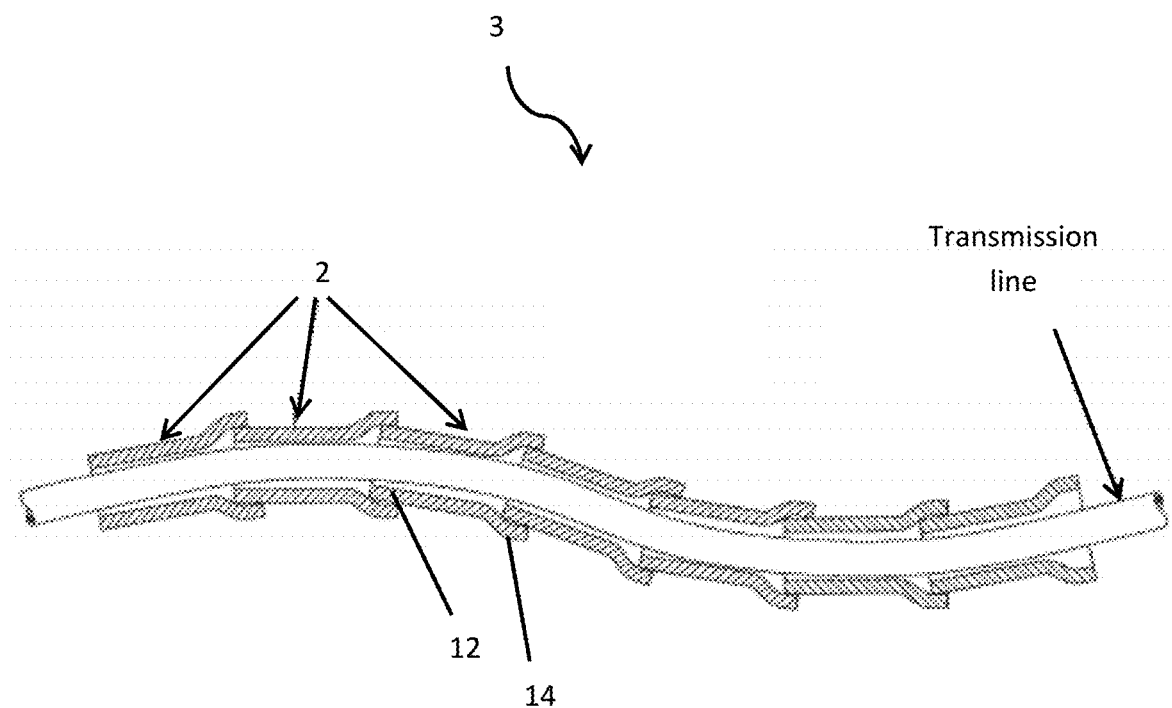
FIG. 2 shows an exemplary protection system formed by a plurality of thimbles placed over a transmission line (e.g., an electrical power cord).

Referring to FIGS. 1 and 2, the protection system 1 can include at least one thimble 2, at least one spacer element 4, at least one sling 6, and at least one lead restraint 8. In some embodiments, the protection system 1 may be employed as a protective sheath 3 or shroud receiving and surrounding at least a portion of an elongate item to provide protection thereto and/or therefrom. It is contemplated for the protection system 1 to be used to provide protection to a transmission line, which may include but is not limited to an electrical power cord, a hydraulic hose, a water hose, etc. However, other items can be protected by the protection system 1.

The item to which the protection system 1 can provide protection for and/or from it preferably elongate and can be flexible or inflexible. Other items that can be protected may include a rope, a hose, a chain, tubing, piping, conduit line, etc. Particular benefits may be achieved when using the protection system 1 to provide protection to elongated flexible members because of the ability of the system 1 to maintain flexibility without compromising effective protection. For example, a plurality of thimbles 2 can be placed over an electrical power cord of an electromagnet lifting assembly to generate a protective sheath 3 that shrouds or clads the electrical power cord. As will be described in more detail later, the structure of each thimble 2 can engage another thimble 2 so as to facilitate several degrees of movement (e.g., rotation, rolling, bending, flexing, etc.) of the protective shroud and/or the electrical power cord. Thus, an electromagnet lifting assembly can be operated (i.e., hoisted, lowered, oscillated, tilted, etc.) without being restricted, as might occur with existing protection systems.

Figure 3A:
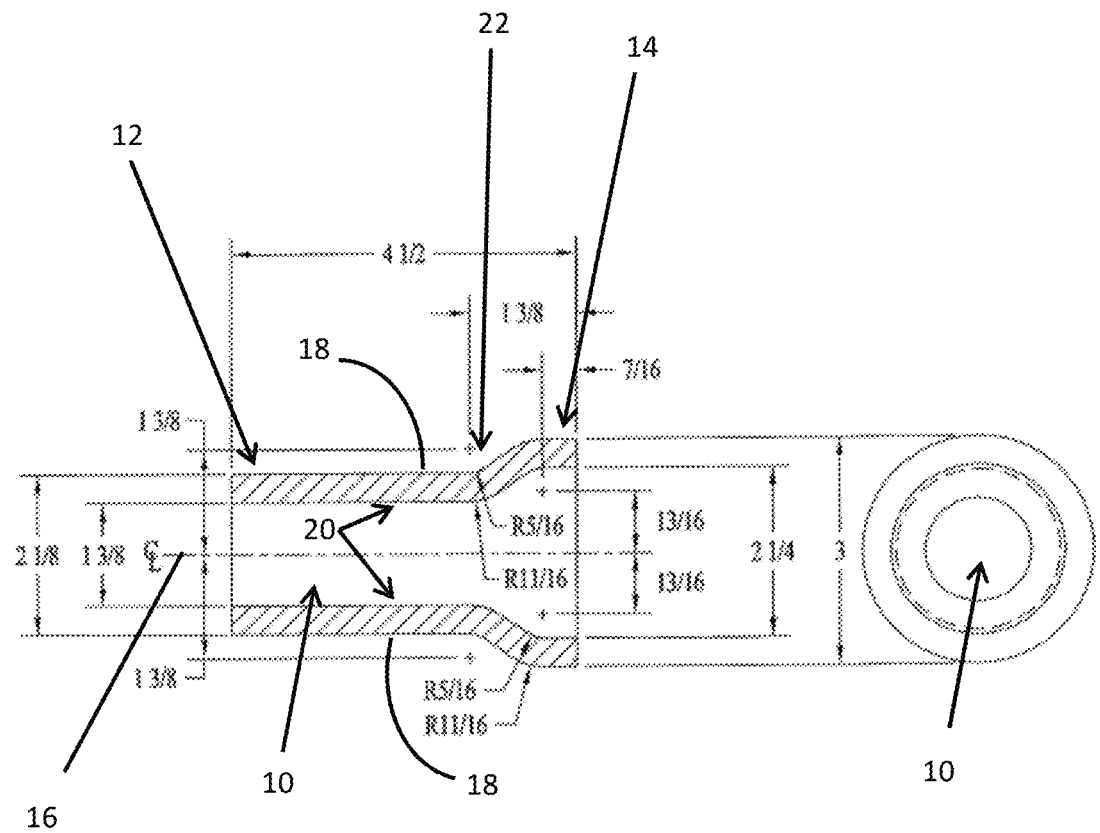
FIGS. 3A-3C show various sized thimbles that may be used with an exemplary protection system, wherein each figure shows a cross-sectional side view and a front view of a thimble.
Figure 3B:
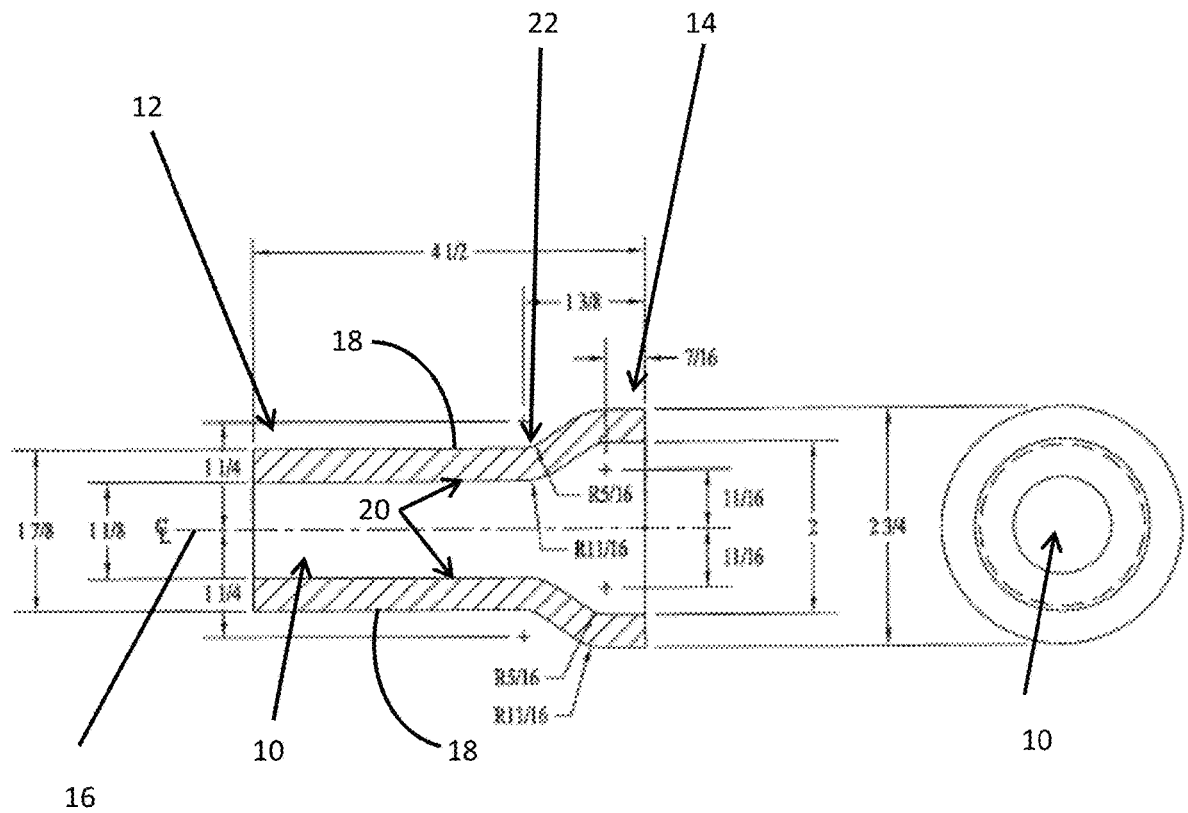

Referring to FIGS. 3A-3B, exemplary embodiments of various sized thimbles 2 are disclosed. Any one thimble 2 can be a hollow member configured to receive a portion of an electrical power cord. In some embodiments, any one thimble 2 can be an elongated member with an aperture 10 formed within an interior portion thereof, the aperture 10 extending from a first end 12 to a second flared end 14. The aperture 10 can traverse the thimble 2 along its longitudinal axis 16. Thus, the thimble 2 can have an exterior surface 18 on an outside of the thimble 2, an interior surface 20 located at the aperture 10, a first end 12 opening, and a second flared end 14 opening. The inner surface of the second flared end 14 is larger than the outer surface of the first 10, such that the first end 10 can be received in the second flared end 14 to form an overlapping type of arrangement.

The aperture 10 can define a bore through which the electrical power cord can be slidably received. The diameter of the bore may be slightly larger than the diameter of the electrical power cord to enable free slidable motion of the thimble 2 about the electrical power cord along the longitudinal direction 16, as well as free rotational motion about an axis defined by the longitudinal direction 16. In some embodiments, the diameter of the bore can be such as to enable slight movement of the thimble in direction transverse to the longitudinal direction 16.

In some embodiments, the exterior surface 18 can be cylindrical in shape; however, other shapes can be utilized. These may include, but are not limited to, cubic, hexagonal, pyramidal, fluted, etc. For example, a hexagonal or fluted shape may be used to provide enhanced gripping, enhance structural rigidity, inhibit rotational motion, generate an aesthetic look, etc. In addition, the exterior surface 18 may be smooth, textured, and/or exhibit other surface ornamentations to provide a slip surface, a non-slip surface, etc. The interior surface 20 can exhibit the same shape and/or surface ornamentation as the exterior surface 18 or a different shape and/or surface ornamentation. It is contemplated for the interior surface 20 to be cylindrical and smooth to further facilitate free motion (e.g., rotational, longitudinal, and/or transverse) of each thimble 2 independently of other thimbles 2 and independently of the electrical power cord. However, an interlocking scheme can be used to force at least two thimbles 2 to move in unison while still enabling independent movement of the interlocked thimbles 2 with respect to the electrical power cord.

While is it shown for the aperture 10 to extend from the first end 12 to the second end 14 in a linear manner, it need not do so. For example, the aperture 10 can be curvilinear, angled, sinusoidal, undulating, etc.

A plurality of thimbles 2 can be placed over an electrical power cord by each thimble 2 slidingly receiving the electrical power cord via its aperture 10 to form an arrangement of thimbles 2 (see FIG. 2). The arrangement can be in a serial manner, whereby the first end 10 of a first thimble 2 is received into the second flared end 14 of a second thimble 2 such that the second flared end 14 overlaps the first end 10. This arrangement can be repeated until a desired length of the electrical cord is cladded with the serial arrangement of overlapping thimbles 2. Thus, a sheath 3 can be formed about the electrical power cord by the serial arrangement of overlapping thimbles 2. The arrangement of the sheath 3 can provide advantages over other existing protection systems. For example, if a particular thimble 2 becomes damaged or otherwise inoperable, that particular thimble 2 can be replaced as opposed to replacing the entire sheath 3 or having to repair a portion thereof. The arrangement also enables many degrees of motion to occur with the sheath 3 and/or with the electrical power cord, regardless of whether an individual thimble 2 is rigid, semi-rigid, or flexible. Thus, the sheath 3 can be freely articulated so as to "flex" along with the electrical power cord.

The overlapping interface between the first end 12 of a thimble 2 and the second end 14 of an adjacent thimble 2 can form an engagement that effectively holds each thimble 2 in the arrangement in a desired position without generating a an interlocking connection. Thus, while a thimble 2 can be connected to an adjacent thimble 2, mechanically or otherwise, there need not be such a connection to form the arrangement. Additionally, depending on the particular application, some thimble-to-thimble engagements within the overall arrangement may be an abutment of opposing ends, while other thimble-to-thimble engagements within the overall arrangement can be the overlapping straight end-flared end engagement.

Such engagement schemes can facilitate free manipulation and handling of the electrical power cord when using the protection system 1 to clad the electrical power cord due to the free motioning of the sheath 3 and/or individual thimbles 2 forming the sheath 3. For example, the straight end-flared end engagement can allow the a thimble 2 within the arrangement to move in the longitudinal direction 16, move transverse to the longitudinal direction 16, and/or rotate about the longitudinal axis 16, all of such motions being independent of an adjacent thimble 16 and/or independent of the electrical power cord without causing exposure of the electrical power cord. For example, if a thimble 2 moves longitudinally 16 with respect to an adjacent thimble 2, the flared second end 14 can still maintain coverage of the electrical power cord due to the overlap of the flared second end 14 over the first end 12. This is similarly so for motioning in the transverse direction and/or with rotational motion. This engagement can allow the electrical power cord, and thus the sheath 3, to be rotated, bent, deflected, flexed, stretched, etc., yet still providing adequate protection via the cladding structure. This engagement can further enable the sheath 3 and/or any one thimble 2 to be motioned independently of the electrical power cord so as to not cause damage, e.g., via chafing of the electrical power cord.

As noted above, the interior surface 20 of each thimble may be configured to facilitate free rotational movement of each thimble 2 with respect to the electrical cord and/or the other thimbles 2 in the arrangement. Maintaining such free rotational motion can facilitate further manipulation of the electrical power cord and/or the electromagnet assembly to which it is attached without causing abrasion, frictional wear, chafing, static charge etc. to the electrical power cord. For example, the electrical power cord, with the protective system 1 placed on it, can come into contact with another structure and be protected not only from impact and abrasion caused by the structure, but also from abrasion and wear from the sheath 3 itself. The free rotation of the thimble(s) 2 about the electrical power cord can prevent frictional wear and/or chafing in such occurrences due to the thimble 2 acting as a roller guard. The roller nature of the thimble 2 in such embodiments can further prevent undesired twisting of the electrical power cord in such occurrences as well. For example, the rotational moments may be "absorbed" by the sheath 3, causing the sheath 3 and/or individual thimbles 2 to rotate while the electrical power cord's motion remains static.

Any one thimble 2 can be fabricated from a tough, durable material. For example, any one thimble 2 can be fabricated from urethane. Preferably, any one thimble 2 can exhibit properties of cut resistance, abrasion resistance, and impact resistant. In some embodiments, any one thimble 2 can be fabricated from cast urethane (e.g., DuPont® L 167, with a hardness of 95 Shore A), or other similar materials. However, other materials can be used, which may include, but are not limited to, ceramic, glass, metal, metal alloy, fiber composite, plastic, etc.

Any one thimble 2 can be a tubular shaped member with a straight portion at the first end 12 and a conical flare portion and/or expanding taper at the flared second end 14. In some embodiments, the thimble 2 includes a shape that mostly comprises the straight portion leading to an expanding taper portion (e.g., flared portion). For example, the tubular shaped member can have a straight portion at the first end 12 and extending approximately ⅔ of the length of the thimble 2 towards the flared second end 14 before leading into the flare of the second end 14. However, other straight portion length-to-flared portion length ratios can be utilized. The flare extends in a direction that is radially outward to the longitudinal direction 16. The radial extension of the flared second end 14 can be minimal so as to maintain a low profile of the thimble 2, but large enough to receive the first end 12 of an adjacent thimble 2. This may be done to reduce the risk of snags and/or to prevent unwieldiness of the sheath 3. For example, an outer diameter of the first end 12 can be 2⅛ inches and the outer diameter of the second end 14 (i.e., the outer diameter at the flare) can be 3 inches (see FIG. 3A). Thus, the radial extension in this example can be ⅞ inches.

In an arrangement of a plurality of thimbles 2, the conical flared second end 14 of a first thimble 2 can facilitate sliding receipt of the straight first end 12 of a second thimble 2. For example, a length, or portion of the length, from the first end 12 of a thimble 2 to a flare point 22 (the beginning of the flare of the second end 14) exhibits an outer diameter that is smaller than the inner diameter of the flared second end 14. In particular, the inner diameter of at least a portion of the flared second end 14 is greater than the outer diameter of the first end 12. This enables the first end 12 of an adjacent thimble 2 to be slid into the flared second end 14 in an overlapping arrangement (see FIG. 2). Also shown in FIG. 2, an outer diameter of the first end 12 of each thimble 2 can be smaller than an inner diameter of the second end 14 of each thimble 2 so as to facilitate at least partial insertion of the first end 12 of a first thimble 2 into the second end 14 of a second thimble 2 placed adjacent the first thimble 2 in an overlapping arrangement and in a non-interlocking engagement.

While the thimble 2 is shown as having a straight tubular shape with a conical flare, other differentiated diameter configurations can be used. For example, the second end 14 may exhibit more of an angled taper as opposed to a conical flare. As another example, the second end 14 may exhibit a stepped configuration. In yet another embodiment, the second end 14 may be straight while the first end 12 can taper inward (i.e., inward in a direction radial to the longitudinal axis 16).

Figure 3C:
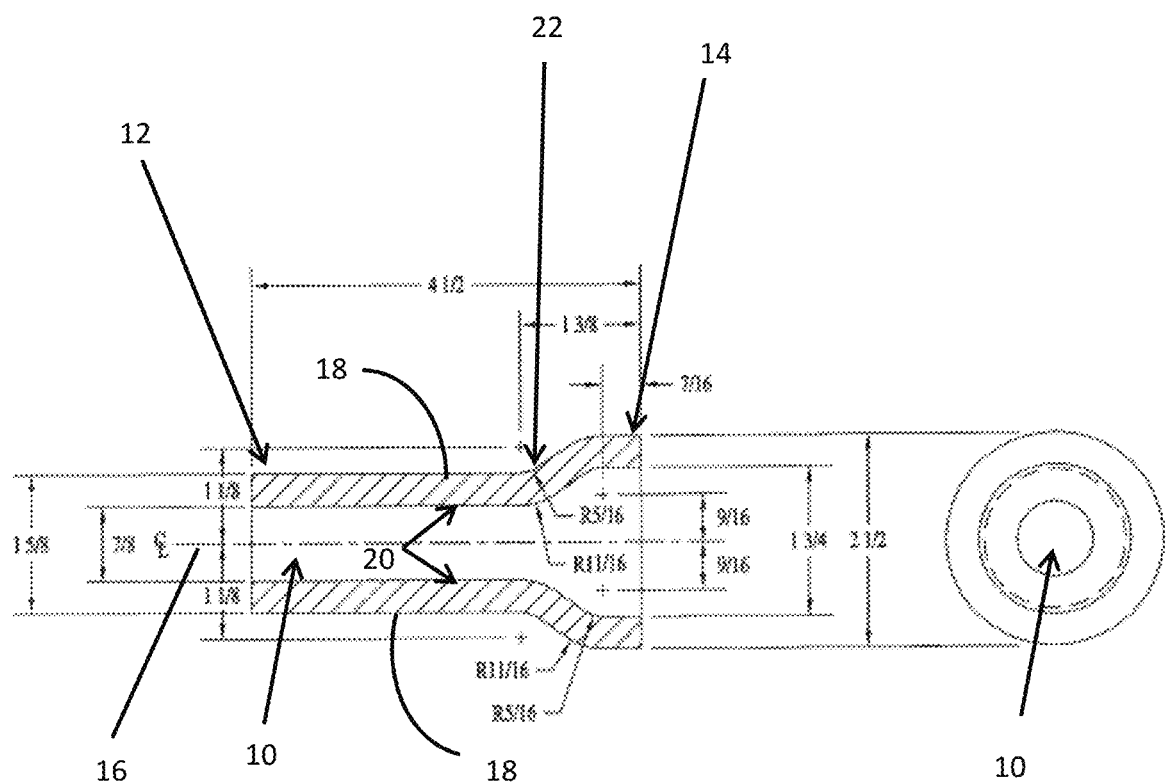

It is contemplated for the thimbles 2 to be fabricated to exhibit various lengths, thicknesses, diameters, hardness, resiliency, electrical resistance, heat resistance, and other material and mechanical properties to accommodate safe and proper use in various applications. For example, thicker/thinner electrical power cords may require thimbles 2 with larger/smaller inner diameters. Exemplary lengths, widths and thicknesses of various thimbles 2 are shown in FIGS. 3A-3C. Other lengths, widths and thicknesses as will be appreciated by one skilled in the art.

Referring back to FIG. 1, an exemplary use of the protection system 1 can be to protect an electrical power cord of an electromagnet assembly. At least one thimble 2 can be donned on the electrical power cord by slidingly receiving the electrical power cord through the aperture 10. The electrical power cord can then be connected to the electrical connectors of the electromagnet assembly for operation of the electromagnet. As described above, a plurality of thimbles 2 can be used in a serial arrangement to generate the sheath 3. Each thimble 2 can be orientated in a same direction and/or any one thimble 2 can be orientated in a different direction (i.e., so as to cause at least two first ends 12 to engage each other or at least two second ends 14 to engage each other). FIG. 1 shows the electrical power cord being routed from a hoist mechanism to the electromagnet so that the electrical power cord is suspended from the hoist mechanism and is partially rested upon the electromagnet. Each thimble 2 is orientated so that each first end 12 is more proximal to the hoist mechanism than its corresponding flared second end 14. This may be done to ensure that each flared second end 14 rests upon and covers the first end 12 of the adjacent thimble 2 due to gravity acting on the thimble arrangement as the electrical power cord hangs from the hoist. However, any one thimble 2 or all of the thimbles 2 can be orientated in the opposite manner.

In use, the electrical power cord can be disconnected at the hoist mechanism to facilitate slidably placing a thimble 2 on the electrical power cord. An initial thimble 2 can be placed on the electrical power cord and be made to rest against a structure of the electromagnet. For example, the initial thimble 2 can rest against a lead clamp of the electromagnet, using the lead clamp of the electromagnet as a buttress to prevent further movement of the thimble 2 along the thimble's longitudinal direction 16. Subsequent thimbles 2 can be placed on the electrical power cord so that they slide down the electrical power cord and lie adjacent the previously donned thimble 2 in an overlapping arrangement, as described above. This can continue until a desired length of the electrical power cord is cladded by the sheath 3 and/or until a desired length of sheath 3 has been generated. The electrical power cord can then be reconnected to the hoist mechanism.

In some embodiments, before the electrical power cord is reconnected to the hoist mechanism, a spacer element 4 can be placed on the electrical cord after a desired length of the electrical power cord is cladded by the sheath 3 and/or until a desired length of sheath 3 has been generated. For example, a length of slit hose, or other tubular member, can be secured around a distal end of the electrical power cord to serve as the spacer element 4. The slit hose can be secured around a portion of the electrical power cord that has not been cladded, it can be secured around a cladded portion of the electrical power cord, and/or both. The slit hose can be secured by a fastening means 24, which can include at least one hose clamp. Once secured, the spacer element 4 can act as a buttress at the hoist member end to prevent, or at least inhibit, movement of the sheath 3 and/or any one thimble 2 of the sheath 3 beyond the spacer element 4. Thus, the spacer element 4 and the buttress structure at the initial thimble 2 end can serve to confine the sheath 3 in a spatial dimension. The spacer element 4 can be used to restrict motion of any one and/or all thimbles 2 along their longitudinal directions 16. For example, the spacer element 4 can be used to cause each thimble 2 to abut each other and not move longitudinally at all. Alternatively, the spacer element 4 can be used to allow some longitudinal movement between each thimble 2 within the arrangement, but to restrict that movement to a certain degree. For instance, preventing and/or inhibiting longitudinal movement of any thimble 4 within the arrangement in its longitudinal direction 16 can be done to prevent and/or inhibit any separation in the engagements of the plurality of thimbles 2 with each other and maintain the overlapping configuration of thimbles 2. In other words, the spacer element 4 can be used to allow longitudinal movement 16 of two adjacent thimbles 2 so that the first end 12 of the first thimble 2 can freely move within the conical flare of the second end 14 of an adjacent second thimble 2, but to restrict that movement so that the first end 12 of the first thimble 2 does not extend beyond the second end 14 of the adjacent second thimble 2.

Figure 4:
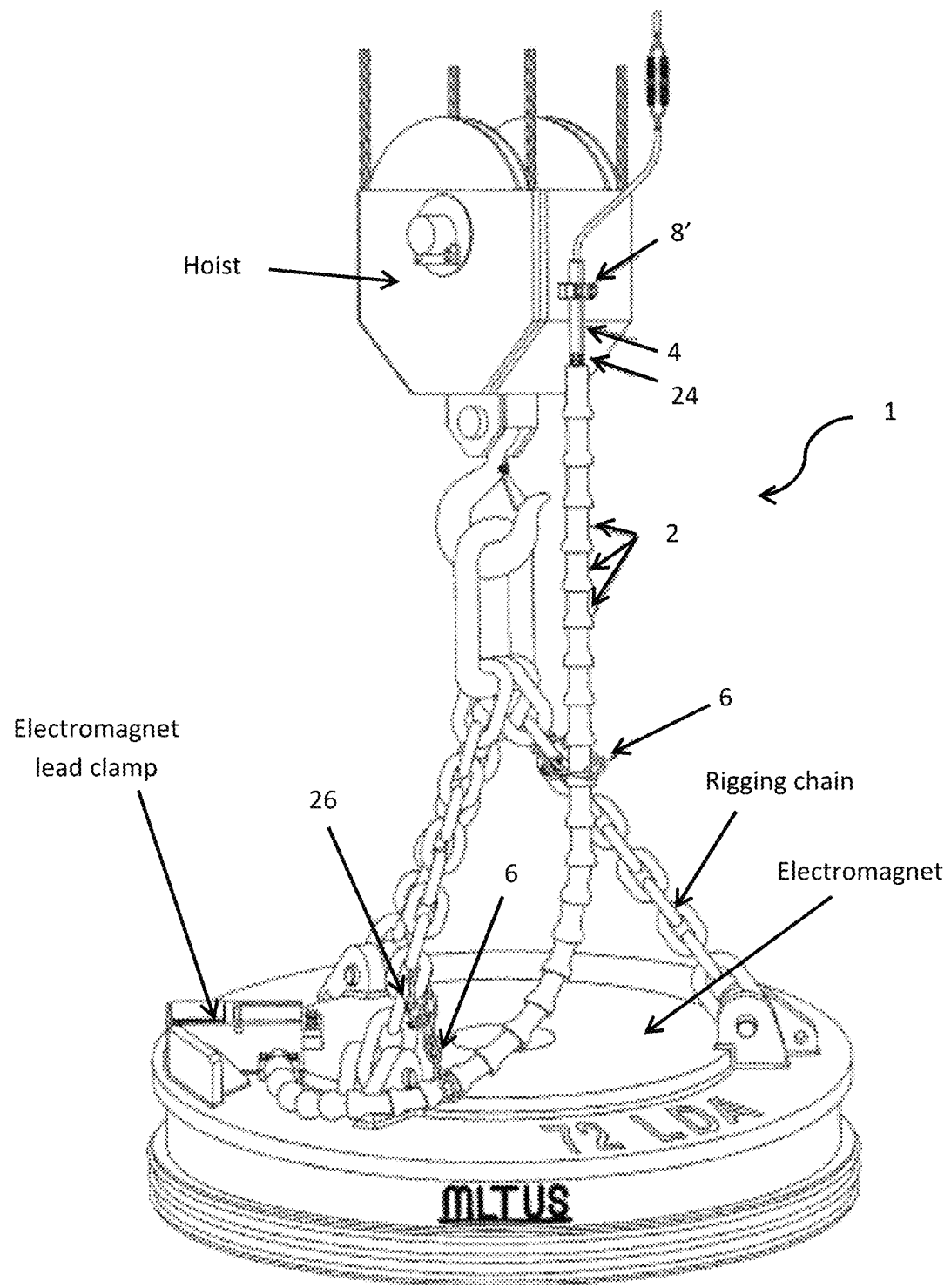
FIG. 4 shows an environmental view of an alternative embodiment of an exemplary protection system used to clad an electrical power cord of an electromagnet assembly.

In a further embodiment, the spacer element 4 can be secured to the electrical power cord such that there is still a portion of the electrical power cord exposed so as to provide a lead for electrical connection at the hoist mechanism. A lead restraint 8 (see FIG. 1) or lead clamp 8' (see FIG. 4) may be applied to this exposed portion of the electrical power cord to facilitate affixment of the electrical power cord to a boom, a hook block, and/or other portion of the hoist mechanism. For example, the lead restraint 8 or lead clamp 8' can be secured to the electrical power cord so as to be adjacent the clamp 24 securing the spacer element 4. The lead restraint 8 or lead clamp 8' can also facilitate electrical connection of the electrical power cord to a power supply.

In further embodiments, at least one sling 6 can be used to tether the electrical power cord. For example, at least one chain sling 6 can be wrapped around the electrical power cord and another structure (e.g., a rigging chain) of the electromagnet assembly. A fastener 26 (e.g., a shackle) can be used to secure the chain sling 6 in place. Such an arrangement can provide further protection by restricting movement of the protection system 1 and/or the electrical power cord.

As noted above, the protective system 1 can be used on other items, such as rope, chain, tubing, pipe, etc. For example, at least one thimble 2 can be placed over the rigging chain of the electromagnet assembly in a similar fashion as described above. This can be done to provide protection to the rigging chain and/or provide protection from the rigging chain.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range, including the end points.

We claim:

1. A flexible protection system, comprising:
a serial arrangement of a plurality of thimbles, each thimble having a first end, a flared second end, and an aperture running along a longitudinal axis of each thimble from the first end to the flared second end, and wherein said flared second end has an expending taper at the flared second end and wherein said flared second end extends in a direction that is radially outward to said longitudinal axis of each thimble, wherein an outer diameter of the first end of each thimble is smaller than an inner diameter of the second end of each thimble so as to facilitate at least partial insertion of the first end of a first thimble into the second end of a second thimble placed adjacent the first thimble in an overlapping arrangement and in a non-interlocking engagement along a longitudinal direction, wherein said second end of each thimble is of an expanding taper having a plurality of internal radii of said inner diameter of said second end of each thimble that is larger than an external radii of said outer diameter of said first end of each thimble and wherein said inner diameter of at least a portion of said second end is greater than said outer diameter of said first end such that said first end of an adjacent first thimble is slid into said second end of an adjacent second thimble devoid of an interlocking connection along a longitudinal direction, and wherein said outer diameter of each thimble has a continuous surface that is devoid of a slot running along an entire length of said longitudinal axis of said thimble, wherein the aperture of each thimble is sized to receive an elongate item within the serial arrangement of the plurality of thimbles and (i) facilitate free motion of any one thimble relative to other thimbles and facilitate free motion of any one thimble independently of any adjacent thimble, and (ii) facilitate a free slidable motion of the any one thimble about the elongate item along a longitudinal direction, and (iii) facilitate a free rotational motion about an axis defined by said longitudinal direction of each thimble independently of other thimbles and independently of said elongate item to establish a roller nature of each thimble, and (iv) facilitate a motion of each thimble relative to other thimbles that is transverse to said longitudinal direction; and a spacer element secured to at least one of the elongate item and buttressed against the first end of a last thimble of the serial arrangement of the plurality of thimbles, and a lead restraint secured to said elongate item and said spacer element, the spacer element restricting the movement of the plurality of thimbles in the longitudinal direction such that at least partial insertion of the first end of each thimble into the second end of each adjacent thimble is maintained without exposure of the elongate item received within the aperture of each thimble.

2. The flexible protection system recited in claim 1, wherein the serial arrangement forms a sheath around the elongate item to serve as a flexible protective cladding.

3. The flexible protection system recited in claim 1, further comprising a sling tethering the elongate item to an ancillary structure.

4. The flexible protection system recited in claim 1, wherein the elongate item comprises a transmission line or an electrical power cord.

5. The flexible protection system recited in claim 4, further comprising the lead restraint connecting the electrical power cord to an ancillary structure.

6. The flexible protection system recited in claim 1, wherein each thimble comprises urethane.

7. A flexible protection system, comprising:
a plurality of members, each member having a first end and a flared second end, and a bore running along a longitudinal axis of the member from the first end to the flared second end, the bore sized to receive an elongate element to be protected, wherein said flared second end of each member is of an expanding taper having a plurality of internal radii of an inner diameter of said flared second end of each member that is larger than an external radii of said outer diameter of said first end of each member and wherein said inner diameter of at least a portion of said second end is greater than said outer diameter of said first end such that said first end of an adjacent first member is slid into said second end of an adjacent second member devoid of an interlocking connection along a longitudinal direction, and wherein said outer diameter of each member has a continuous surface that is devoid of a slot running along an entire length of said longitudinal axis of said member, wherein the plurality of members are positioned in an overlapping arrangement and in a non-interlocking engagement along a longitudinal direction about the elongate element, such that the first end of a member is received in the flared second end of an adjacent member and (i) free motion of any one member relative to any other member and free motion of any member independently of any adjacent member, (ii) a free slidable motion of any one member about the elongate element along a longitudinal direction, (iii) a free rotational motion about an axis defined by said longitudinal direction of each member independently of other members and independently of said elongate element to establish a roller nature of each member, and (iv) a motion of each member relative to other members that is transverse to said longitudinal direction is maintained while preserving the overlapping arrangement; and a spacer element secured to at least one of the elongate element and buttressed against the first end of a last member of the plurality of members, and a lead restraint secured to said elongate element and said spacer element, the spacer element restricting the movement of the plurality of members in the longitudinal direction such that at least partial insertion of the first end of each member into the flared second end of each adjacent member is maintained without exposure of the elongate element received within said bore of each member.

8. The flexible protection system recited in claim 7, wherein the plurality of members forms a sheath around the elongate element to serve as a flexible protective cladding.

9. The flexible protection system recited in claim 7, wherein each member is freely rotatable about an entire circumference of the elongate element received within its bore.

10. The flexible protection system recited in claim 7, wherein each member comprises urethane.

11. The flexible protection system recited in claim 7, wherein the elongate element comprises a transmission line or an electrical power cord.

12. A protection device for an elongate element, comprising:

a member having a first end, a flared second end, and an aperture formed therein running along a longitudinal axis of the member from the first end to the flared second end, wherein an inner diameter of the flared second end is greater than an outer diameter of the first end; wherein said flared second end of each member is of an expanding taper having a plurality of internal radii of an inner diameter of said second end of each member that is larger than an external radii of said outer diameter of said first end of each member and wherein said inner diameter of at least a portion of said flared second end is greater than said outer diameter of said first end such that said first end of an adjacent first member is slid into said flared second end of an adjacent second member devoid of an interlocking connection along a longitudinal direction, and wherein said outer diameter of each member has a continuous surface that is devoid of a slot running along an entire length of said longitudinal axis of said member, wherein the aperture is configured to slidingly receive an elongate element to at least one of provide protection thereto and provide protection therefrom; and wherein the first end of one member is receivable into the second end of an adjacent member to form an overlapping and non-interlocking engagement along a longitudinal direction between adjacent members such that movement of the one member can occur independently of movement of the adjacent member and independently of movement of the elongate element without exposure of the elongate element slidingly received within the one member and the adjacent member, wherein (i) a free slidable motion of any one member about the elongate element along a longitudinal direction, (ii) a free rotational motion about an axis defined by said longitudinal direction of each member independently of other members and independently of said elongate element to establish a roller nature of each member, and (iii) a motion of each member relative to other members that is transverse to said longitudinal direction is maintained while preserving the overlapping arrangement; and a spacer element secured to at least one of the elongate element and buttressed against the first end of a last member of the plurality of members, and a lead restraint secured to said elongate element and said spacer element, the spacer element restricting the movement of the plurality of members in the longitudinal direction such that at least partial insertion of the first end of each member into the flared second end of each adjacent member is maintained without exposure of the elongate element received within said bore of each member.

13. The protection device recited in claim 12, wherein the first end of each member is straight and the second end is flared.

14. The protection device recited in claim 12, wherein the member comprises urethane.

15. The protection device recited in claim 12, wherein the elongate element comprises a transmission line or an electrical power cord.

16. A protection device for a power cable of an industrial electro-magnetic lifting device comprising:

a protective component having a top portion and a flared bottom portion, and a length along said top and flared bottom portions, said top portion including a plurality of non-uniform external radii along said length of said top portion, said body having an opening formed through said top portion and an opening formed through said flared bottom portion along the lengths of the top and flared bottom portions, said top portion opening and said flared bottom portion opening being continuous with one another to enable said protective component to be disposed around a power cable, said flared bottom portion including a plurality of non-uniform internal radii along the length of the flared bottom portion, said flared bottom portion has an expending taper at the flared bottom portion and wherein said flared bottom portion extends in a direction that is radially outward to a longitudinal axis of said protective component;

said body top portion nests within said body flared bottom portion opening of a second protective component disposed around said power cable, said flared bottom portion opening of said second protective component cooperating with said body top portion to restrict movement of the second protective component, said protective component body top portion being free of interlocking connections to said flared body bottom portion opening of said second protective component, and wherein an outer diameter of each protective component has a continuous surface that is devoid of a slot running along an entire length of said longitudinal axis of said protective component; and wherein a plurality of said protective components are disposed around said power cable, each consecutive one of said plurality of protective components having said top portion of a preceding one of the plurality of protective components nested within said bottom portion opening, and a spacer element secured to at least said power cable and buttressed against said top portion of a last protective component in a plurality of protective components, and a lead restraint secured to said power cable and said spacer element, said spacer element restricting the movement of the plurality of protective components in the longitudinal direction such that at least partial insertion of said top portion of each protective component into the flared bottom portion of each adjacent protective component is maintained without exposure of the power cable.

17. The protective component for a power cable of an industrial electro-magnetic lifting device of claim 16, wherein said protective component is formed of a high density polymer.

18. The protective component for a power cable of an industrial electro-magnetic lifting device of claim 17, wherein said high-density polymer is resistant to degradation by ultra-violet rays.

* * * * *